Aug. 17, 1937.  E. W. HOBBS  2,090,532
DEVICE FOR DELIVERING MEASURED QUANTITIES OF LIQUIDS
Filed May 12, 1937
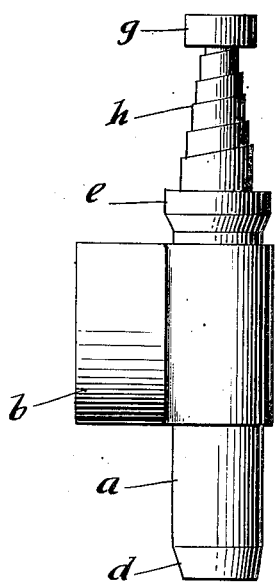
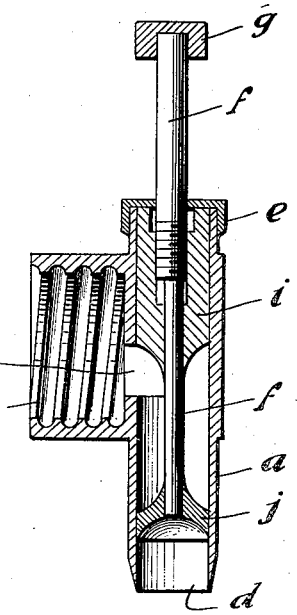
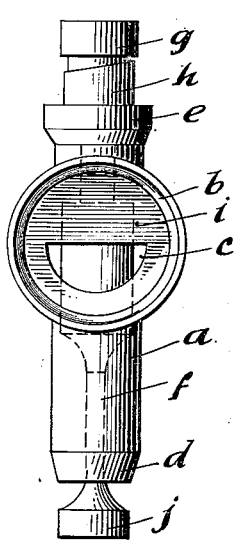
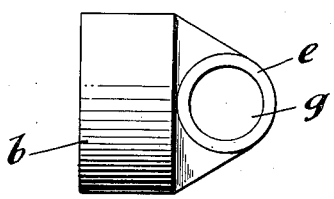
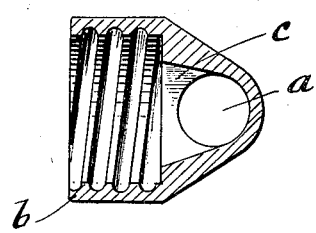
INVENTOR
Edwin William Hobbs
BY
Frederick W. Barker
ATTORNEY Patented Aug. 17, 1937

2,090,532

UNITED STATES PATENT OFFICE 2,090,532

DEVICE FOR DELIVERING MEASURED QUANTITIES OF LIQUIDS

Edwin William Hobbs, London, England

Application May 12, 1937, Serial No. 142,095
In Great Britain December 14, 1935

2 Claims. (Cl. 221—114)

This invention concerns devices for delivering measured quantities of liquids and refers more particularly to the type incorporating two interconnected plungers or pistons, and its objects are to provide a device which in construction and operation has one or more of the following advantages over such devices as have been hitherto proposed.

It is particularly adapted for the delivery without waste from bottles, canisters and like containers, of small quantities of liquids of high specific gravity or which are viscous in character as is the case with many extracts and like preparations for human consumption.

Further, it is constructed so that, firstly, when not in operation its internal surfaces are open to the container and the container is sealed from the atmosphere, secondly, at the inlet stage of each operation the measuring chamber is rapidly and completely filled and the displaced air simultaneously transferred to the container, thirdly, at the measurement stage the chamber is momentarily sealed from both container and atmosphere, fourthly, at the delivery stage the transfer of air and liquid from the chamber takes place rapidly and completely due to the shape and location of the delivery piston with regard to the delivery orifice.

Still further, the delivery piston and orifice are shaped so as to prevent liquid from coming or remaining exposed in contact with external surfaces, the capacity of the measuring chamber may be adjusted by making the position of the inlet piston adjustable with regard to the delivery piston, and the device can be readily dismantled for cleaning or sterilization.

In the drawing:—

Figures 1 and 4 show one form of the device in elevation and plan respectively.

Figs. 2 and 5 are cross sections of the device in elevation and plan respectively, and Fig. 3 shows the device in elevation from the rear with the pistons in the delivery position.

As shown, the invention consists of a fixed tubular member $a$ which is more or less vertical when in the operating position and which has at or near its centre a lateral tubular projection $b$ incorporating a large semicircular feed space and inlet orifice $c$ and having an internal screw thread or other means for connecting the lateral tube in line with, and the vertical tube more or less transversely to, a complementary projection from the container, one end of the tube $a$ which tapers externally to a fine edge being the delivery orifice $d$, and the other end being fitted with a perforated cap or cover $e$; and a moving member in the form of an operating rod $f$ fitted with a knob or push button $g$, passing through a partially compressed spiral or involute spring $h$ and then, by way of the cap $e$, into the tube where it interconnects two specially shaped and located pistons $i$ and $j$, spaced from each other so that in the course of each operation of the device the measuring chamber is the space enclosed by the internally opposed faces of the pistons and the wall of the tube.

The effect of the spring is to draw the pistons up the tube to the inlet position as shown in Fig. 2 when the long inlet piston $i$ is held against the inner face of the cap $e$ and its lower circumferential edge is very slightly below the top of the inlet orifice, and the distance between the upper circumferential edge of the short delivery piston $j$ and the delivery end of the tube is not less than the depth or radius of the inlet orifice.

The length of the inlet piston is greater than the depth or radius of the inlet orifice and greater than the distance between the upper edge of the delivery piston and the delivery end of the tube, and the effective length of operating rod which projects from the top of the tube is less than the length of the inlet piston and not greater than the distance between the pistons.

Therefore, when the operating rod is pressed into the tube, the inlet piston covers the inlet orifice and seals the measuring chamber from the container without exerting either pressure or suction upon the contents of the container, before the delivery piston has entirely emerged from the delivery orifice, and the chamber is thus isolated until the continued movement of the operating rod brings the pistons to the delivery position as shown in Fig. 3, when the inlet piston continues to cover the inlet orifice and the delivery piston has entirely emerged from the tube.

The operating rod and the delivery piston are then kept in alignment with the tube by the cap through which the rod passes and by the long inlet piston, so that the measuring chamber remains open to the atmosphere until pressure is removed from the operating rod and the spring returns the pistons to the inlet position.

The inner face of the inlet piston is a tapered cone which in conjunction with the large semicircular inlet orifice ensures the rapid and complete transfer of air from and liquid into the measuring chamber, and the downward movement of the piston across the inlet aperture to effect a smooth closure without causing either pressure or suction so that the operation or accuracy of the device as a measuring instrument cannot be affected by the forward ingress or leakage of either air or liquid.

The inner face of the delivery piston is also a tapered cone and its outer face is concave, which construction in conjunction with the external taper of the tube towards the delivery orifice and the large symmetrical opening resulting from the complete emergence of the delivery piston ensures the rapid and clean delivery of the liquid from the measuring chamber and, as the piston returns, the recovery of any residual film of liquid from the internal surface of the tube so that dripping from or fouling of the delivery orifice are both prevented.

Means for adjusting the capacity of the measuring chamber, which may however be omitted, are provided by making the inlet piston movable on the operating rod, preferably by making it rotatable on a threaded length thereof. By the removal of the cap *e* or the push button by unscrewing it from the operating rod, the device can be readily dismantled for cleaning or sterilization.

Variations within the spirit and scope of my invention are equally comprehended by the foregoing disclosure.

I claim:—

1. A device of the character described comprising a tubular member open at its lower end, an apertured cap closing the other end of said member, a projection extending laterally from said tubular member to permit attachment to the outlet of a container, said projection having an inlet orifice leading into said tubular member, an inlet piston slidably mounted in said tubular member, a delivery piston positioned below said inlet piston, a rod maintaining the pistons in spaced relation to define a measuring chamber inclosed by said pistons and the wall of said tubular member, means for automatically elevating said delivery piston within the tubular member to close its discharge portion and to expose the measuring chamber to the inlet orifice of said projection to permit the passage of a measured quantity of material to said chamber, and means passing through the apertured cap to depress said pistons, said inlet piston closing said orifice prior to the complete emergence of said delivery piston beyond the end of said tubular member, said delivery piston making sliding contact with the discharge portion of said tubular member whereby only the measured contents of said chamber are discharged.

2. A device as claimed in claim 1, in which the inner face of the delivery piston presents a tapered cone and its outer face is concave, and the outer surface of the tubular member tapers towards the end of the discharge portion, the sharp edges thus provided assuring a complete discharge of the contents of the measuring chamber when the delivery piston emerges from said discharge portion, and preventing fouling of said discharge portion when said delivery piston returns within said discharge portion.

EDWIN WILLIAM HOBBS.